United States Patent
Weiss (10) Patent No.: US 7,441,111 B2
(45) Date of Patent: Oct. 21, 2008

(54) CONTROLLED PROGRAM EXECUTION BY A PORTABLE DATA CARRIER

(75) Inventor: Dieter Weiss, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 621 days.

(21) Appl. No.: 10/495,569

(22) PCT Filed: Oct. 29, 2002

(86) PCT No.: PCT/EP02/12074

§ 371 (c)(1),
(2), (4) Date: Sep. 23, 2004

(87) PCT Pub. No.: WO03/042547

PCT Pub. Date: May 22, 2003

(65) Prior Publication Data

US 2005/0033943 A1    Feb. 10, 2005

(30) Foreign Application Priority Data

Nov. 16, 2001 (DE) ................................ 101 56 394

(51) Int. Cl.
*G06F 9/22* (2006.01)
(52) U.S. Cl. ..................................... 712/245
(58) Field of Classification Search ................ 712/245; 717/127, 128, 129
See application file for complete search history.

(56) References Cited

U.S. PATENT DOCUMENTS

| | | | |
|---|---|---|---|
| 4,939,393 A | 7/1990 | Petty | |
| 5,288,979 A * | 2/1994 | Kreft | 235/380 |
| 5,592,613 A * | 1/1997 | Miyazawa et al. | 714/6 |
| 5,732,272 A | 3/1998 | Gochee | |
| 5,784,607 A * | 7/1998 | Henry et al. | 712/245 |

(Continued)

FOREIGN PATENT DOCUMENTS

EP    1 056 012 A2    11/2000

(Continued)

OTHER PUBLICATIONS

Kohler, Markus: Laufzettel für Diplomanden des Lehrstuhls 7, Universität Dortmund,http://web.archive.org/web/2001042511126/ http://ls7-www.cs.uni-dortmund.de/mastertheses/laufzettel, Oct. 19, 2000.

*Primary Examiner*—Eric Coleman
(74) *Attorney, Agent, or Firm*—Rothwell, Figg, Ernst & Manbeck, P.C.

(57) ABSTRACT

In a method for controlled program execution by a portable data carrier, the value of a status counter (ZZ) is altered during execution of each controlled section (36.x) of an executed program (30) in order to reflect the processing of the respective controlled section (36.x); when executing a jump instruction (42.x), which causes one or more controlled sections (36.x) to be skipped, the value of the status counter (ZZ) is altered as if the skipped controlled sections (36.x) had been executed and the value of the status counter (ZZ) is compared at at least one test point (38) with at least one admissible value. A portable data carrier has corresponding features. The invention provides reliable protection against manipulations of the portable data carrier and is also suitable for application in executing complex programs.

19 Claims, 4 Drawing Sheets

U.S. PATENT DOCUMENTS 6,094,718 A * 7/2000 Tanaka et al. ............... 712/34
6,148,437 A * 11/2000 Shah et al. ............... 717/128
6,353,924 B1 3/2002 Ayers et al.
6,453,430 B1 * 9/2002 Singh et al. ............... 714/47
6,625,725 B1 * 9/2003 Wu et al. ............... 712/245
6,915,416 B2 * 7/2005 Deng et al. ............... 712/227

FOREIGN PATENT DOCUMENTS

WO    WO 00/54155 A1    9/2000

* cited by examiner

CONTROLLED PROGRAM EXECUTION BY A PORTABLE DATA CARRIER

CROSS-REFERENCE TO RELATED APPLICATION

This application is a National Stage of International Application Serial No. PCT/EP02/12074, filed Oct. 29, 2002.

FIELD OF THE INVENTION

The invention relates in general to the technical field of program execution by a portable data carrier comprising a program memory with at least one program and a processor core for executing this program. A portable data carrier of this type can, in particular, be a chip card in various forms or a chip module. In particular, the invention relates to controlled program execution in order to detect interference or attacks and to initiate suitable error handling.

BACKGROUND OF THE INVENTION

In many techniques for attacking portable data carriers the normal program run is disturbed by external influences. Interferences of this type can be caused in particular by voltage pulses, the effect of heat or cold, electrical or magnetic fields, electromagnetic waves or particle radiation. For example it is possible to manipulate register contents in the processor core by light flashes on the exposed semiconductor chip of the portable data carrier. The program counter can potentially be modified by such a light attack to make the portable data carrier emit confidential data from an input/output buffer contrary to the programming stored in it.

A device for controlling a door lock motor in a vehicle is known from European patent application EP 1 056 012 A2 in which a control processor executes a plurality of sub-programs one after the other, a counter being incremented after each sub-program. After execution of the sub-programs a check is made as to whether the counter status corresponds to the number of sub-programs.

However, this known device relates only to a system permanently installed in the vehicle. A more general use, in particular in a portable data carrier, is not considered. Moreover, only a strictly sequential sequence of all sub-programs is provided in this device. The teaching known from EP 1 056 012 A2 is therefore not suitable for more complex applications, in which individual sub-programs are optionally to be skipped.

SUMMARY OF THE INVENTION

An object of the invention is accordingly to at least partially avoid the problems of the prior art. A further object of the invention is to create a method for controlled program execution by a portable data carrier as well as a portable data carrier which provide reliable protection against manipulations of the value of the program counter. A further object of the invention is to create a method for controlled program execution by a portable data carrier as well as a portable data carrier which are suitable for use in executing complex programs. A further object of the invention is to achieve particularly high protection with low expenditure.

According to the invention, the above objects are wholly or partially achieved by a method for controlled program execution by a portable data carrier comprising a program memory, a processor core and at least one status counter, wherein the program memory comprises at least one program executable by the processor core and with a plurality of controlled sections, and wherein the reading of the status counter is altered during execution of each controlled section in order to reflect the processing of the respective controlled section; during execution of a jump instruction, as a result of which one or more controlled sections are skipped, the reading of the status counter is altered as if the skipped controlled sections had been executed; and the reading of the status counter is compared with at least one admissible value at at least one test point, wherein, on agreement, the program execution is continued and in the event of a difference, error handling takes place.

Further according to the invention, the above objects are wholly or partially achieved by a portable data carrier comprising a program memory, a processor core and at least one status counter, the program memory comprising at least one program which is executable by the processor core and with a plurality of controlled sections, the program memory comprising commands to cause the processor core to execute the at least one program in a controlled way, wherein the reading of the status counter is altered during execution of each controlled section in order to reflect the processing of the respective controlled section; during execution of a jump instruction, as a result of which one or more controlled sections are skipped, the reading of the status counter is altered as if the skipped controlled sections had been executed; and the reading of the status counter is compared with at least one admissible value at at least one test point, wherein, on agreement, the program execution is continued and in the event of a difference, error handling takes place.

The invention proceeds from the basic concept of controlling the correct program run by a status counter which is entrained during the program execution. The program has a plurality of controlled sections, the processing of which leading in each case to a change in the status counter. The controlled sections do not need to coincide with sub-programs or program modules. The reading of the status counter is compared with one or more admissible values at at least one test point of the program and in the event of a difference suitable error handling takes place.

According to the invention at least the possibility of the program comprising at least one jump instruction is provided, by which one or more controlled sections are skipped and therefore not executed. In this case, the reading of the status counter is changed in conjunction with execution of the jump instruction as if the skipped controlled sections had been executed. The value of the status counter can then be tested at a subsequent point in time independently of the execution of the jump instruction. The flexibility in the configuration of the program to be executed can thus be considerably increased without limitations with respect to security having to be made.

The status counter can be configured as a register in the processor core or as a memory region in the working memory of the portable data carrier. In preferred embodiments of the invention the status counter is configured as a differential status counter, of which the value results from the difference between two counters implemented in terms of hardware which are called a base counter and an active counter. The status counter is thus prevented from constantly assuming one and the same sequence of values during the advancing program run. The use of a differential status counter therefore makes the method used more difficult to spy out and increases the security thereof. The base counter is preferably regularly initialised in that it is set to the respective reading of the active counter.

In principle, the structure of the program to be executed is not subject to any limitations. In preferred configurations, which are envisaged in particular for chip cards or chip modules, the basic structure of the program is a loop, however, which comprises a starting section, a plurality of controlled sections and an action section.

Preferably the starting section induces reading-in of an external command, the controlled sections relate to processing of the command, and a response is emitted in the action section. In this case, the test point, or one of the test points when there are a plurality of test points, is preferably located between the last controlled section and the action section, so the response is only emitted when testing of the status counter has not resulted in any indication of interference with the program execution. A general feature of preferred embodiments of the invention, irrespective of said program structure, is to provide a test point before each outwardly oriented action of the portable data carrier.

The program preferably comprises one or more modules to be executed one after the other which in turn each contain at least one controlled section. In some embodiments each module consists of exactly one controlled section and optionally a test as to whether the subsequent modules are to be executed or skipped. In other embodiments at least some of the modules contain a plurality of controlled sections.

A further increase in the monitoring extent is achieved if at least one of the modules is configured as a controlled module with at least one module-internal test point. Either the value of the status counter since the start of the program execution or the start of the current execution of the loop can be investigated for agreement with one or more predetermined values in this module-internal test point, or the change in the status counter since the start of the module execution can be tested. In the second case, the reading of the status counter or a value connected therewith, for example the status of the active counter, is preferably buffered in a local base counter prior to the first change in the status counter in the module.

A local counter can similarly be introduced in further configurations within a module or within a section, the counter monitoring the correct program run within the module or within the section independently of the global status counter. The local counter can be configured according to the techniques described above in conjunction with the global status counter, a construction as a differential local counter in particular being possible.

Each jump instruction, via which controlled sections can be skipped, is preferably coupled to corresponding commands for adaptation of the status counter. However, configurations of the invention are also provided in which individual jump instructions are not accompanied by adaptation of the status counter. In this case a plurality of admissible counter statuses are usually defined at the test point or the test points. As the monitoring accuracy is reduced by this measure it is, however, preferably only used for the mentioned local status counter.

The portable data carrier according to the invention is preferably constructed as a chip card or chip module. In preferred configurations it has features corresponding to those just described and/or features mentioned in the dependent method claims.

BRIEF DESCRIPTION OF THE DRAWINGS

Further features, advantages and objects of the invention are apparent from the following detailed description of a plurality of embodiments and alternative embodiments. Reference is made to the schematic drawings in which.

DETAILED DESCRIPTION OF EMBODIMENTS OF THE INVENTION

Figure 1:
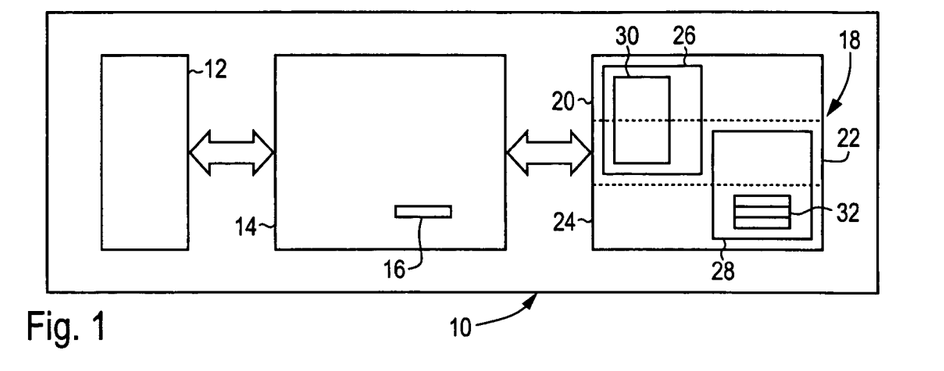
FIG. 1 is a block diagram with functional units of a portable data carrier according to one embodiment of the invention.

The portable data carrier 10 illustrated in FIG. 1 is constructed in the present embodiment as a chip card. It has an interface 12 for contactless or contact-bound data exchange with the environment, a processor core 14 with a program counter 16 and a memory 18. The processor core 14, the memory 18 and components of the interface 12 are usually integrated on a single semiconductor chip.

The memory 18 has a plurality of regions configured in different memory technologies. In the embodiment of FIG. 1 these are a read-only memory 20 configured, for example, as a mask-programmed ROM, a non-volatile read-write memory 22 configured in FLASH technology and a volatile read-write memory 24 configured as a RAM (random access memory). In terms of concept, the memory 18 contains a program memory 26 located in the regions 20 and 22 and a working memory 28 in the regions 22 and 24.

The program memory 26 contains a plurality of programs of which one is indicated in FIG. 1 and provided with the reference numeral 30. Memory locations for a plurality of counters 32 are reserved in the working memory 28 and, more precisely, in the embodiment of FIG. 2 for a status counter ZZ, in the embodiment of FIG. 3 for an active counter AZ and a base counter BZ, in the modification of FIG. 4 for the status counter ZZ and a local base counter LBZ and in the modification of FIG. 5 for the status counter ZZ and the local counter LZ. In alternative configurations these counters can all or partially also be configured as registers of the processor core 14 instead of in the working memory 28 or be stored in further units of the portable data carrier 10 not shown in FIG. 1.

In the present embodiment the program counter 16 of the processor core 14 can be influenced by light flashes directed onto the semiconductor chip. In order to nevertheless rule out a potential attack resulting therefrom on data managed in the processor core, the status counter ZZ in the program run according to FIG. 2 is entrained during the program run as a control mechanism independent of the program counter 16 and in each case tests for consistency with a predetermined counter status prior to executing an outwardly directed action.

Figure 2:
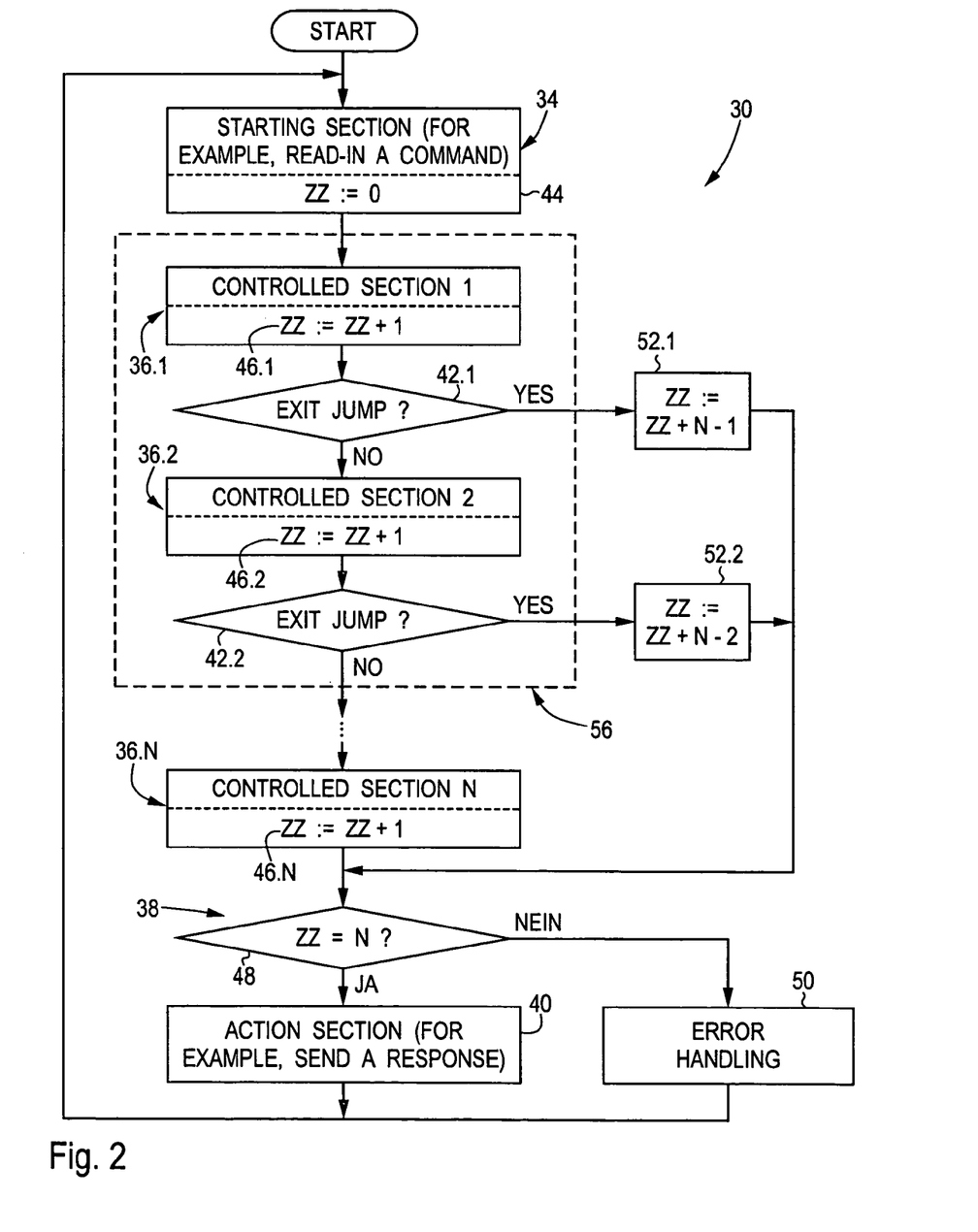
FIG. 2 is a flow diagram of the program run in the embodiment of FIG. 1.

In the embodiment of FIG. 2, the program 30 has the structure of an endless loop comprising a starting section 34, a plurality of controlled sections 36.1, 36.2, . . . , 36.N designated collectively hereinafter by 36.x, a test point 38 and an action section 40. A command to be processed by the portable data carrier 10 is, for example, read-in via the interface 12 in the starting section 34. The controlled sections 36.x relate to processing stages of the command executed one after the other in which, for example, the command is firstly tested for validity, then an authorisation test takes place, then a test of the executability of the command takes place, for example via a test as to whether requested data is present, and finally the command is executed in that, for example, requested data is written into an output buffer. In the present embodiment a response is transmitted via the interface 12 in the action section 40 and as a result either the successful execution of the command or failure of command execution is signalised.

Error situations can occur in the functions of the individually controlled sections 36.x cited by way of example above which make executing the subsequent controlled sections 36.x in the program run superfluous. If, for example, a command must not be executed for lack of authorisation, the further processing steps are superfluous. There are therefore exit jump tests 42.1, 42.2, etc. designated collectively hereinafter by 42.x, in which a check is made as to whether the controlled sections 36.x following in the prescribed sequence are to be executed or skipped. Each exit jump test 42.x is a conditioned jump instruction which tests the value of an exit jump flag. The exit jump flag is in turn set by the respective preceding controlled section 36.x to indicate that an exit jump should take place. An exit jump test 42.x of course only needs to be associated with a controlled section 36.x when the value of the exit jump flag can change in this controlled section 36.x.

To check the program run independently of the status of the program counter 16 and therefore to be able to recognise a light attack, the status counter ZZ is used. The status counter ZZ is set to an initial value by an initialisation instruction 44 in conjunction with the execution of the starting section 34. In the embodiment of FIG. 2 this value is zero. Each controlled section 36.x also contains an instruction 46.x in which the status counter ZZ is altered, namely incremented by one unit in the present embodiment. The instruction 46.x is then executed within each controlled section 36.x only when the operations to be performed by the respective section 36.x have finished. The instruction 46.x is preferably the last command of each controlled section 36.x in each case.

Overall therefore the status counter ZZ, assuming that no jumps take place, contains a value during the program run corresponding to the number of executed controlled sections 36.x. In the exemplary sequence of FIG. 2 this number is designated by the value N. A test 48 therefore takes place at the test point 38 in which it is ascertained whether the reading of the status counter ZZ has the single admissible value N. If this is the case the action section 40 is executed. If the status counter ZZ has a different value the program execution branches to an error handling routine 50.

Comprehensive resetting of the portable data carrier 10 or even, with repeated occurrence of the error, blocking of the portable data carrier 10, for example, can take place as error handling 50. A suitable error message can also be sent via the interface 12. In any case, the error handling 50 should ensure that no data of the portable data carrier 10 already potentially provided for output passes to the outside via the interface 12.

According to the previously described sequence, the status counter ZZ would not have the admissible value N if a jump across one or more controlled sections 36.6 had been brought about by one of the exit jump tests 42.x. To ensure correct program functioning even in this case, a corresponding correction instruction 52.1, 52.2, hereinafter designated collectively by 52.x, is carried out whenever controlled sections 36.x are skipped owing to an exit jump test 42.x. The status counter ZZ is altered in any correction instruction 52.x as if the skipped controlled sections 36.x had been carried out. In the present case the status counter ZZ is increased in every correction instruction 52.x by the number of skipped sections 36.x. The status counter ZZ therefore has the single admissible value N on reaching the test point 38 even if an exit jump has taken place during execution of the loop.

In the present embodiment the status counter ZZ was initialised with the value zero and increased by one unit during processing of each controlled section. In alternative configurations other initialisation values and/or other methods for altering the status counter are provided. For example, the status counter ZZ can be initialised in the instruction 44 with the value 1 or N or another value. It is also possible, in the event that after an exit jump test 42.x controlled sections 36.x are skipped, for the status counter ZZ to continue to count without correction and instead to decrement the value N by the number of skipped sections 36.x. The correction instructions 52.1, 52.2 are then N:=1 and N:=2, etc. Any mathematical operation can be performed in instructions 46.x, for example subtraction of a unit or bitwise shifting or rotation. The admissible value in test 48 must of course be adapted accordingly in these cases.

Figure 3:
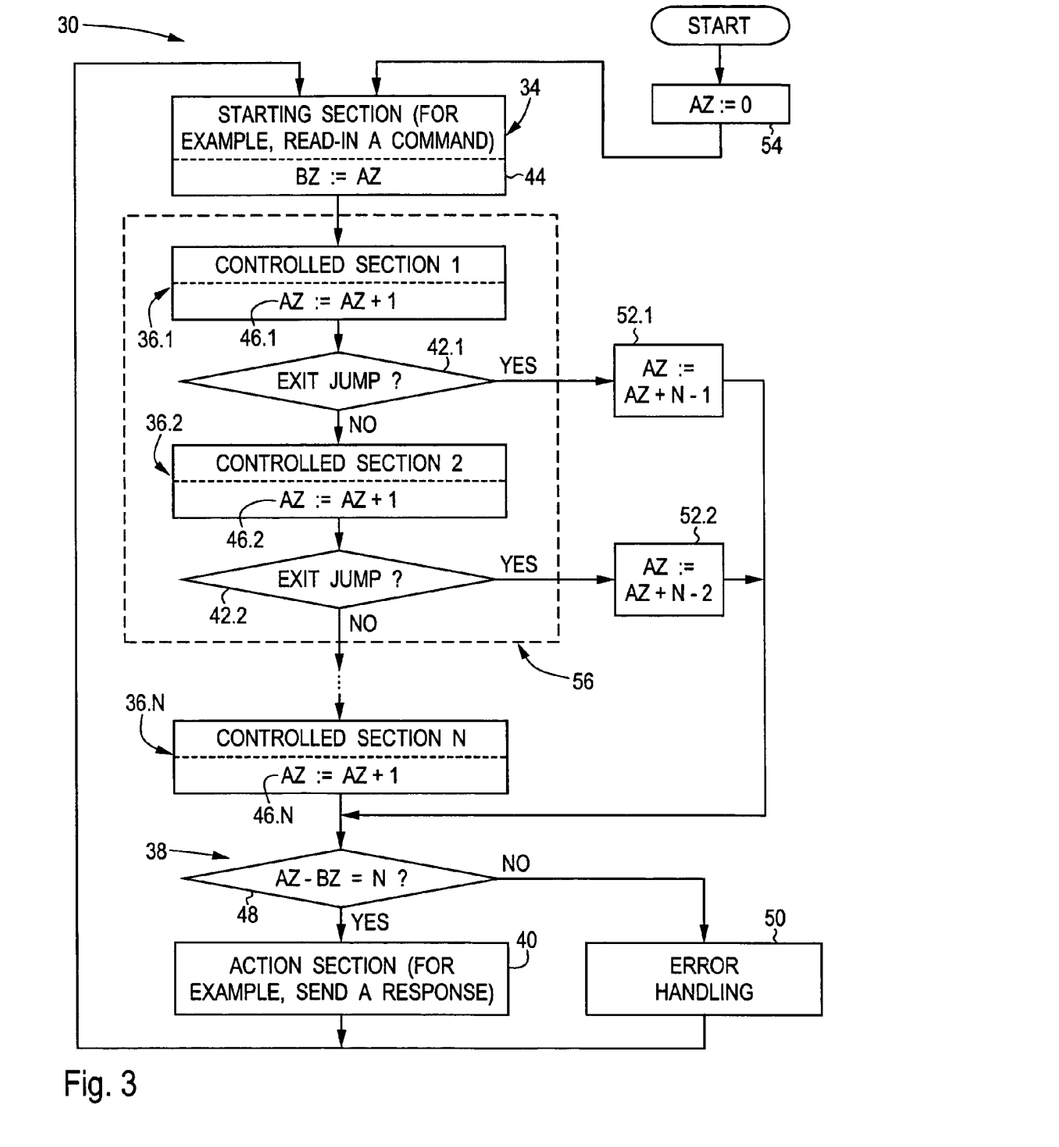
FIG. 3 is a flow diagram of a configuration variation of FIG. 2.

FIG. 3 shows a further variation of the sequence of FIG. 2. The status counter ZZ is not directly implemented here as counter 32 in the working memory 28, rather two counters 32 are provided in the working memory 28, namely the active counter AZ and the base counter BZ. This configuration of the status counter ZZ as a differential counter avoids the situation where each status of the program counter 16 corresponds to fixed and always identical values of the counters 32 in the working memory 28.

The sequence shown in FIG. 3 starts with an initialisation step 54 in which the active counter AZ is set to a start value, in the present embodiment the value zero. After the initialisation step 54 the program structure illustrated in FIG. 3 is identical to that of FIG. 2 for which reason the same reference numerals are used in FIG. 3 as in FIG. 2. The differences consist in that the base counter BZ is set to the respective status of the active counter AZ in instruction 44. The status of the base counter BZ is therefore the "zero mark" in any looping, from which the active counter AZ begins to count.

According to FIG. 3, the active counter AZ is changed in instructions 46.x and 52.x in the same manner as the status counter ZZ in FIG. 2. Finally, the difference between the active counter AZ and the base counter BZ is compared in test 48 with the admissible value N. A comparison with the always constant value N is preferably avoided in the actual programming of the test 48 in that, for example, initially an interim result BZ+N is calculated and this interim result is then compared with the value of the active counter AZ.

The active counter AZ is not reset from one execution of the loop to the next, rather the "zero mark" defined by the base counter BZ is merely established again in instruction 44. The values of the counters AZ and BZ thus change from loop execution to loop execution, so that it is made very difficult to spy out the method of FIG. 3. In variations of the method of FIG. 3 the value of the active counter AZ can be arbitrarily reset after the test 48. The roles of the counters 32 in the working memory 28, which respectively form the active counter AZ and the base counter BZ, can also be swapped from time to time.

Figure 4:
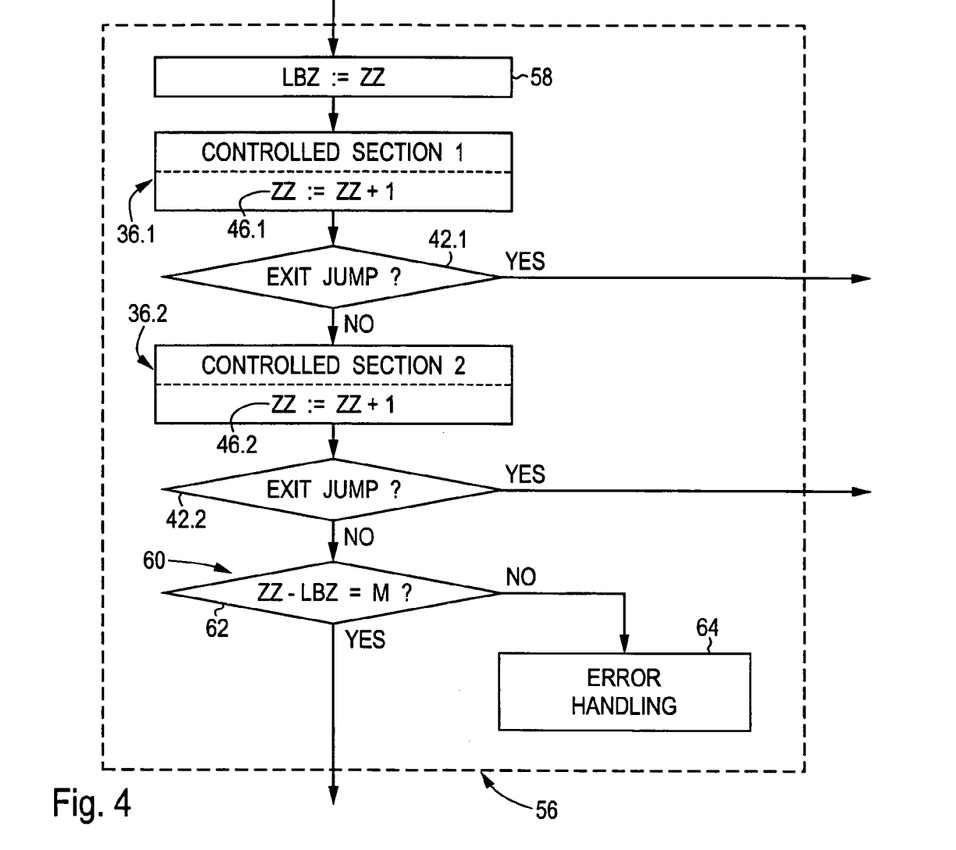
FIG. 4 is a flow diagram of the program run in a controlled module according to a further configuration variation of FIG. 2.

FIG. 2 and FIG. 3 show by way of example a module 56 which combines the two controlled sections 36.1 and 36.2 and the two allocated jump tests 42.1 and 42.2. FIG. 4 shows this module 56 of FIG. 2 in a further variation comprising an additional local check of the change in the status counter ZZ during execution of the module 56. According to FIG. 4, the reading of the status counter ZZ is saved for this purpose at the start of the module execution in a local base counter LBZ.

After processing of the controlled sections 36.1 and 36.2 and of the corresponding jump tests 42.1 and 42.2, the program execution reaches a module-internal test point 60. Here it is checked in test 62 whether the change in the status counter ZZ with respect to the value LBZ saved at the start of the module corresponds to the number M of controlled sections 36.x executed in the meantime. In the present example M has the value 2. If the module-internal change in the status counter ZZ has the admissible value, the program execution is continued, otherwise a module-internal routine for error handling 64 is executed.

The configuration variation of FIG. 4 can also be used in the method according to FIG. 3 with a differential status counter. In this case, either the value of the active counter AZ or the difference AZ–BZ is stored in step 58 in the local base counter LBZ and the difference between this value or this difference and the value of the local base counter LBZ is formed in test 62.

Figure 5:
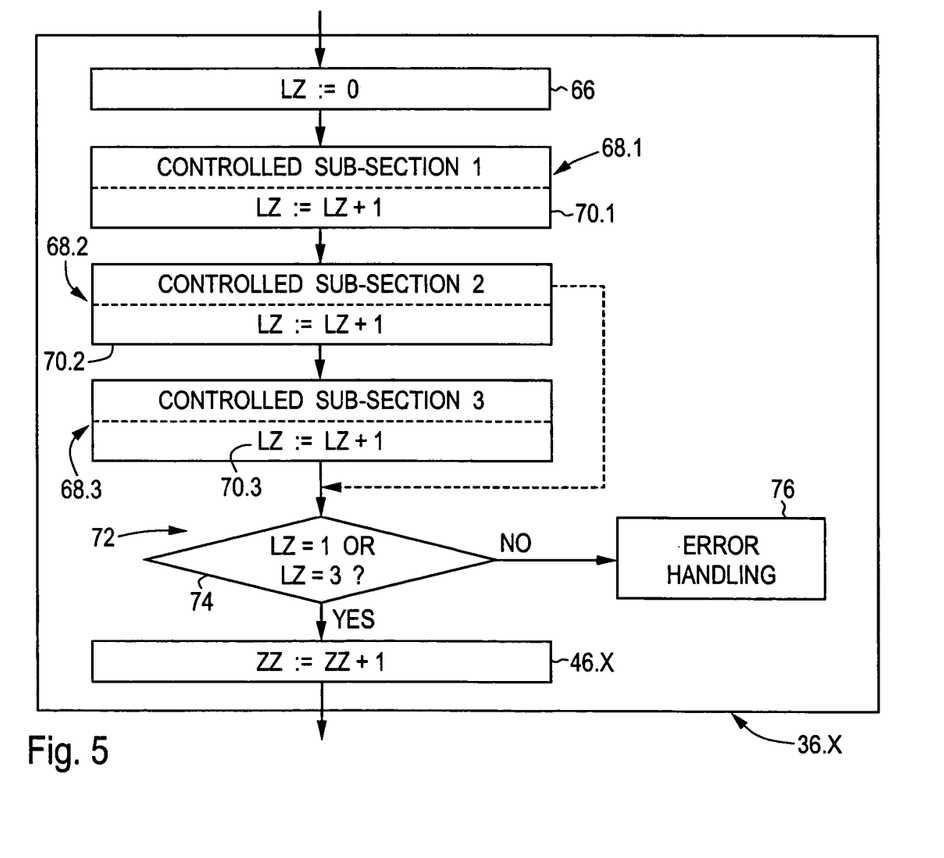
FIG. 5 is a flow diagram of the program run in a section comprising a plurality of controlled sub-sections.

While during checking of the module-internal change in FIG. 4 the global status counter ZZ was advanced, it is also possible to introduce a further, local status counter within a module 56 or within a controlled section 36.x. FIG. 5 shows an exemplary sequence of this configuration variation in which a controlled section 36.x of FIG. 2 is once more protected by a local status counter LZ.

According to FIG. 5, the local status counter LZ is initialised in step 66 with the value zero. Execution of a plurality of, in the present example three, controlled sub-sections 68.1, 68.2, 68.3 follows, which collectively are designated 68.x. The local counter LZ is incremented in each of the controlled sub-sections 68.x in a respective instruction 70.x. The second controlled sub-section 68.2 comprises a conditional exit jump, illustrated in FIG. 5 by a dashed arrow, via which the incrementation step 70.2 and the third sub-section 68.3 are skipped.

After processing the last controlled sub-section 68.3 the program execution reaches a local test point 72. For checking purposes a test 74 is executed in which the status of the local counter LZ is compared with the admissible values 1 and 3. If there is agreement with one of these values the program execution is continued with instruction 46.x to change the global status counter ZZ, otherwise an error handling 76 takes place.

The above variations already described in conjunction with the status counter ZZ are also possible for implementing the local counter LZ of FIG. 5. In particular, the local counter LZ can also be formed as a differential counter. If the method of FIG. 5 is used in combination with the configuration of FIG. 3 only the allocation 46.x has to be adapted.

FIG. 5 illustrates the comparison of a counter with a plurality of admissible values which is necessary when different program run paths are provided without the corresponding correction instructions 52.x. In some embodiments of the invention a comparison of this type with a plurality of admissible values can also be used for the global status counter ZZ. However, this configuration reduces the reliability of the control and is therefore preferred only for local status counters LZ. Conversely, the exit jump in the second controlled sub-section 68.2 can also run in further variants via a suitable correction instruction. In this case only a single status of the local counter LZ, namely the counter status 3, is admissible in test 74.

The invention claimed is:

1. Method for controlled program execution by a portable data carrier comprising a program memory, a processor core and at least one status counter, wherein the program memory comprises at least one program executable by the processor core and with a plurality of controlled sections, said method comprising steps of:
    altering the reading of the status counter during execution of each controlled section in order to reflect the processing of the respective controlled section,
    during execution of a jump instruction, as a result of which one or more controlled sections are skipped, altering the reading of the status counter as if the skipped controlled sections had been executed, and
    comparing the reading of the status counter with at least one admissible value at at least one test point, wherein, on agreement, the program execution is continued and in the event of a difference, error handling takes place.

2. Method according to claim 1, characterised in that the status counter is configured as a differential status counter, of which the counter value corresponds to the difference between the values of an active counter and of a base counter.

3. Method according to claim 1, characterised in that the program is configured as a loop which comprises a starting section, the plurality of controlled sections, and an action section, the test point or one of the test points being located between the last controlled section and the action section.

4. Method according to claim 3, characterised in that the status counter is configured as a differential status counter, of which the counter value corresponds to the difference between the values of an active counter and of a base counter, wherein the base counter is set to the respective value of the active counter before execution of the controlled sections.

5. Method according to claim 1, characterised in that the program comprises at least one module containing one or more of the controlled sections.

6. Method according to claim 5, characterised in that the module is a controlled module in which the change of the status counter within the module is compared at a test point with at least one admissible value.

7. Method according to claim 6, characterised in that before the respective first change of the status counter in the controlled module the reading of the status counter or a value connected therewith is buffered in a local base counter.

8. Method according to claim 1, characterised in that at least one of the controlled sections comprises a plurality of controlled sub sections, the value of a local counter being changed during execution of each controlled sub-section to reflect the processing of the respective controlled sub-section, and the value of the local counter being compared at at least one test point with at least one admissible value.

9. Method according to claim 1, characterised in that the method is used for repelling light attacks in which the value of a program counter of the processor core is manipulated by the influence of light.

10. Portable data carrier, comprising a program memory, a processor core and at least one status counter, the program memory comprising at least one program which is executable by the processor core and with a plurality of controlled sections, the program memory comprising commands to cause the processor core to execute the at least one program in a controlled way, wherein:
    the reading of the status counter is altered during execution of each controlled section in order to reflect the processing of the respective controlled section,
    during execution of a jump instruction, as a result of which one or more controlled sections are skipped, the reading of the status counter is altered as if the skipped controlled sections had been executed, and
    the reading of the status counter is compared with at least one admissible value at at least one test point, wherein, on agreement, the program execution is continued and in the event of a difference, error handling takes place.

11. Portable data carrier according to claim 10, wherein the portable data carrier is one of a chip card and a chip module.

12. Portable data carrier according to claim 10, characterised in that the status counter is configured as a differential status counter, of which the counter value corresponds to the difference between the values of an active counter and of a base counter.

13. Portable data carrier according to claim 10, characterised in that the program is configured as a loop which comprises a starting section, the plurality of controlled sections, and an action section, the test point or one of the test points being located between the last controlled section and the action section.

14. Portable data carrier according to claim 13, characterised in that the status counter is configured as a differential status counter, of which the counter value corresponds to the difference between the values of an active counter and of a base counter, wherein the base counter is set to the respective value of the active counter before execution of the controlled sections.

15. Portable data carrier according to claim 10, characterised in that the program comprises at least one module containing one or more of the controlled sections.

16. Portable data carrier according to claim 15, characterised in that the module is a controlled module in which the change of the status counter within the module is compared at a test point with at least one admissible value.

17. Portable data carrier according to claim 16, characterised in that before the respective first change of the status counter in the controlled module the reading of the status counter or a value connected therewith is buffered in a local base counter.

18. Portable data carrier according to claim 10, characterised in that at least one of the controlled sections comprises a plurality of controlled sub sections, the value of a local counter being changed during execution of each controlled sub-section to reflect the processing of the respective controlled sub-section, and the value of the local counter being compared at at least one test point with at least one admissible value.

19. Portable data carrier according to claim 10, characterised in that the controlled program execution is used for repelling light attacks in which the value of a program counter of the processor core is manipulated by the influence of light.

* * * * *